United States Patent
Haataja

(10) Patent No.: US 10,444,459 B2
(45) Date of Patent: Oct. 15, 2019

(54) ARTICULATING OPTICAL FIBER GUIDE SYSTEM

(71) Applicant: CommScope Technologies LLC, Hickory, NC (US)

(72) Inventor: Timothy Jon Haataja, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/769,703

(22) PCT Filed: Oct. 19, 2016

(86) PCT No.: PCT/US2016/057715
§ 371 (c)(1),
(2) Date: Apr. 19, 2018

(87) PCT Pub. No.: WO2017/070218
PCT Pub. Date: Apr. 27, 2017

(65) Prior Publication Data
US 2018/0314025 A1 Nov. 1, 2018

Related U.S. Application Data

(60) Provisional application No. 62/243,476, filed on Oct. 19, 2015.

(51) Int. Cl.
*G02B 6/44* (2006.01)
*G02B 6/38* (2006.01)

(52) U.S. Cl.
CPC ......... *G02B 6/4461* (2013.01); *G02B 6/3873* (2013.01); *G02B 6/3893* (2013.01); *G02B 6/44* (2013.01)

(58) Field of Classification Search
CPC .. G02B 6/4461; G02B 6/3873; G02B 6/3893; G02B 6/44
See application file for complete search history.

(56) References Cited

U.S. PATENT DOCUMENTS 4,840,023 A * 6/1989 Borsani .................. F16G 13/10
248/49
5,069,486 A * 12/1991 Kimura .................. F16G 13/10
138/120

(Continued)

FOREIGN PATENT DOCUMENTS

DE 196 17 900 A1 12/1996
DE 10 2009 029 957 A1 2/2011

(Continued)

OTHER PUBLICATIONS

International Search Report and Written Opinion of the International Searching Authority for International Patent Application No. PCT/US2016/057715 dated Dec. 20, 2016, 10 pages.

(Continued)

*Primary Examiner* — Chris H Chu
(74) *Attorney, Agent, or Firm* — Merchant & Gould P.C.

(57) ABSTRACT

An articulating cable guide system for routing cables includes a plurality of fittings connected together via ball and socket coupling. Each fitting includes a base defining a cable support surface and a pair of opposing sidewalls extending therefrom, the support surface and the sidewalls cooperating to define an open first end, an open second end, and an open access end of the base. Each fitting includes at least one of a ball mount and a socket mount. The ball mount includes a plurality of pins aligned along a first plane and the socket mount defines a plurality of slots configured to receive the pins, wherein the pins and the slots restrict the movement of the coupling to pivotal motion generally along (Continued)

two perpendicular planes, wherein each of the two perpendicular planes is different than the first plane.

21 Claims, 7 Drawing Sheets

(56) References Cited

U.S. PATENT DOCUMENTS

| | | | |
|---|---|---|---|
| 5,197,767 A | | 3/1993 | Kimura et al. |
| 5,240,209 A | | 8/1993 | Kutsch |
| 5,824,957 A | * | 10/1998 | Holshausen ............ F16G 13/16 |
| | | | 174/95 |
| 6,076,779 A | | 6/2000 | Johnson |
| 6,143,984 A | | 11/2000 | Auteri |
| 6,356,696 B1 | * | 3/2002 | Bakker ................ G02B 6/4461 |
| | | | 385/114 |
| 6,470,129 B1 | | 10/2002 | Wentworth et al. |
| 6,522,823 B1 | | 2/2003 | Wentworth et al. |
| 6,575,654 B2 | | 6/2003 | Wentworth et al. |
| 6,585,195 B2 | | 7/2003 | Wentworth et al. |
| 6,603,073 B2 | | 8/2003 | Ferris |
| 6,609,684 B2 | | 8/2003 | Van Scoy et al. |
| 6,916,986 B1 | | 7/2005 | Herzog et al. |
| 7,326,863 B2 | | 2/2008 | Herzog |
| 7,383,634 B2 | | 6/2008 | Haataja et al. |
| 7,411,126 B2 | | 8/2008 | Herzog et al. |
| 7,469,090 B2 | | 12/2008 | Ferris et al. |
| 7,493,005 B2 | | 2/2009 | Beck |
| 7,615,710 B2 | | 11/2009 | Sayres |
| 8,275,230 B2 | | 9/2012 | Womack |
| 8,330,042 B2 | | 12/2012 | Owens et al. |
| 8,335,422 B2 | | 12/2012 | Johnson et al. |
| 8,488,936 B2 | | 7/2013 | Sayres |
| 8,600,209 B2 | | 12/2013 | Sayres et al. |
| 8,950,051 B2 | * | 2/2015 | Kampf ................ H02G 3/0608 |
| | | | 29/428 |
| 8,965,169 B2 | | 2/2015 | Haataja et al. |
| 2003/0016931 A1 | * | 1/2003 | Ferris .................... G02B 6/4459 |
| | | | 385/134 |
| 2003/0016989 A1 | | 1/2003 | Wentworth et al. |
| 2005/0172606 A1 | | 8/2005 | Wehler et al. |
| 2009/0025361 A1 | | 1/2009 | Blase et al. |
| 2010/0116803 A1 | | 5/2010 | Gelmetti |
| 2010/0228295 A1 | * | 9/2010 | Whitefield ............ E21B 17/017 |
| | | | 606/278 |
| 2011/0158600 A1 | * | 6/2011 | Kiimbell .............. G02B 6/4461 |
| | | | 385/135 |
| 2013/0160988 A1 | | 6/2013 | Armstrong et al. |

FOREIGN PATENT DOCUMENTS

| | | |
|---|---|---|
| DE | 10 2010 032 920 A1 | 2/2012 |
| DE | 10 2013 000 905 A1 | 10/2013 |
| EP | 0 875 695 A1 | 11/1998 |

OTHER PUBLICATIONS

Extended European Search Report for corresponding European Patent Application No. 16858137.9 dated May 17, 2019, 9 pages.

* cited by examiner

ARTICULATING OPTICAL FIBER GUIDE SYSTEM

CROSS-REFERENCE TO RELATED APPLICATION

This application is a National Stage Application of PCT/US2016/057715, filed on Oct. 19, 2016, which claims the benefit of U.S. Patent Application Ser. No. 62/243,476, filed on Oct. 19, 2015, the disclosures of which are incorporated herein by reference in their entireties. To the extent appropriate, a claim of priority is made to each of the above disclosed applications.

BACKGROUND

This application is directed to a system for the management and routing of optical fiber cables.

In the telecommunications industry, the use of optical fibers for signal transmissions is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system which would require a high capital outlay and which could not be readily adapted to changes in a customer's needs is not practical. Namely, if routing paths, once established, are forever fixed, the system cannot adapt. Also, and perhaps most important, any routing system must protect optical fibers from damage. In the use of optical fibers, it is recognized that the fibers should not be bent beyond a minimum radius of curvature.

Improvements are desired.

SUMMARY

In accordance with the aspects of the disclosure, an optical fiber cable guide/routing/management system is described. More specifically, the optical fiber guide system is in the form of an articulating guide system that allows the individual fittings of the system to be able to pivot in the up, down, left, and right directions relative to each other to define various paths for the fiber optic cables.

According to one aspect of the disclosure, the fiber or cable guide system comprises a plurality of fittings connected together via ball and socket coupling, wherein each fitting includes a base defining a cable support surface and a pair of opposing sidewalls extending therefrom, the support surface and the sidewalls cooperating to define an open first end, an open second end, and an open top of the base, wherein each fitting includes at least one of a ball mount and a socket mount that is configured to fit the ball mount, the ball mount including a plurality of pins aligned along a first plane and the socket mount defining a plurality of slots configured to receive the pins of the ball mount, wherein the pins and the slots are configured to restrict the movement of the ball and socket coupling to pivotal motion generally along two perpendicular planes, wherein each of the two perpendicular planes is different than the first plane.

According to another aspect, the disclosure is directed to a fitting used in an articulating fiber or cable guide system that comprises a base defining a cable support surface and a pair of opposing sidewalls extending therefrom, the support surface and the sidewalls cooperating to define an open first end, an open second end, and an open top of the base, wherein the fitting includes at least one of a ball mount and a socket mount that is configured to fit the ball mount, the ball mount including a plurality of pins aligned along a first plane and the socket mount defining a plurality of slots configured to receive the pins of the ball mount, wherein the pins and the slots are configured to restrict the movement of the ball and socket coupling to pivotal motion generally along two perpendicular planes, wherein each of the two perpendicular planes is different than the first plane.

According to another aspect, the fitting used to form the articulating fiber or cable guide system comprises a base defining a cable support surface and a pair of opposing sidewalls extending therefrom, the support surface and the sidewalls cooperating to define an open first end, an open second end, and an open top of the base, wherein the fitting includes a ball mount at the first end and a socket mount that is configured to fit the ball mount at the second end, the ball mount including a plurality of pins aligned along a first plane and the socket mount defining a plurality of slots configured to receive the pins of the ball mount, wherein the pins and the slots are configured to restrict the movement of the ball and socket coupling to pivotal motion generally along two perpendicular planes, wherein each of the two perpendicular planes is different than the first plane, wherein at least one of the sidewalls of the base defines breakable portions for forming a side exit in addition to the open first and second ends, and wherein the fitting defines a breakline for forming the fitting into two different fittings, one defining a ball-only mount and the other defining a socket-only mount.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, the disclosure relates to management and routing of optical fiber cables. More specifically, the disclosure relates to an optical fiber cable guide/routing/management system. As will be described in further detail, the optical fiber guide system may be in the form of an articulating guide system that allows the individual fittings of the system to be able to pivot in the up, down, left, and right directions relative to each other to define various paths for the fiber optic cables.

Figure 1:
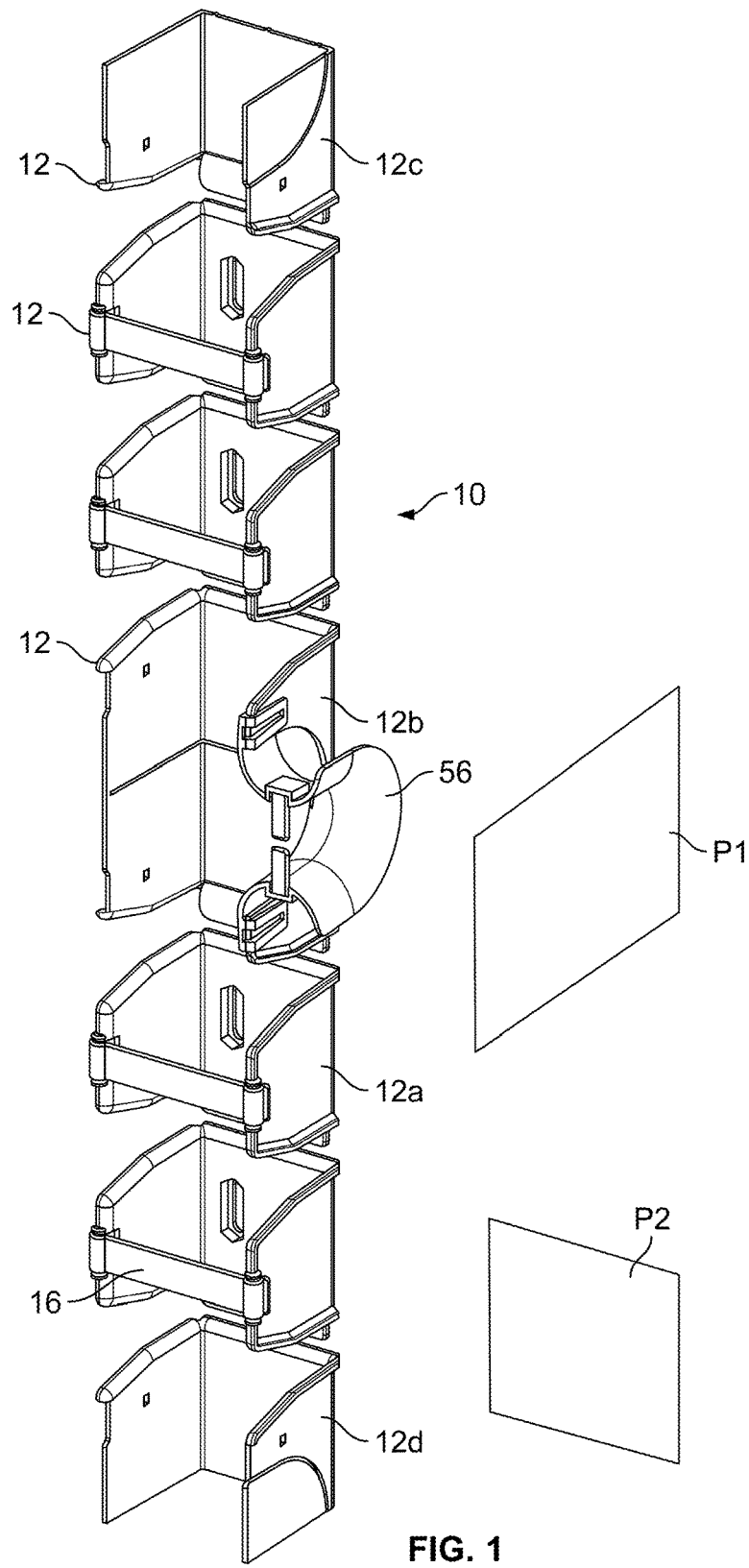
FIG. 1 illustrates a cable guide system having features that are examples of inventive aspects in accordance with the principles of the present disclosure.

Referring now to FIG. 1, an example fiber guide system 10 having features that are examples of inventive aspects in accordance with the principles of the present disclosure is illustrated.

The system 10 of the present application may be formed by a series of fittings 12 that interlock to define a pathway for the optical fibers/cables. In the depicted embodiment, as shown in FIG. 1, the guide system 10 may utilize a number of different types of fittings 12, depending upon the use and the application of the system 10.

Figure 2:
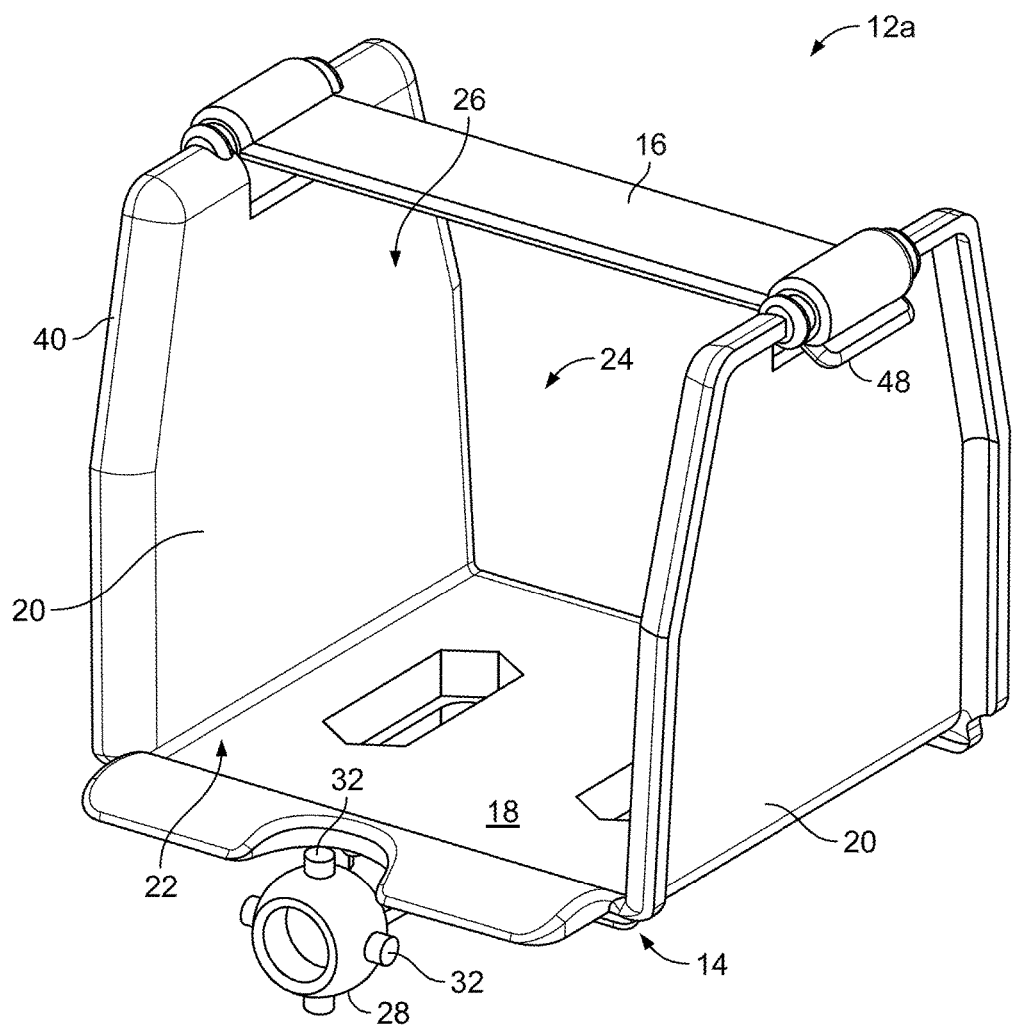
FIG. 2 illustrates the ball end of a fitting used to form the cable guide system of FIG. 1.
Figure 3:
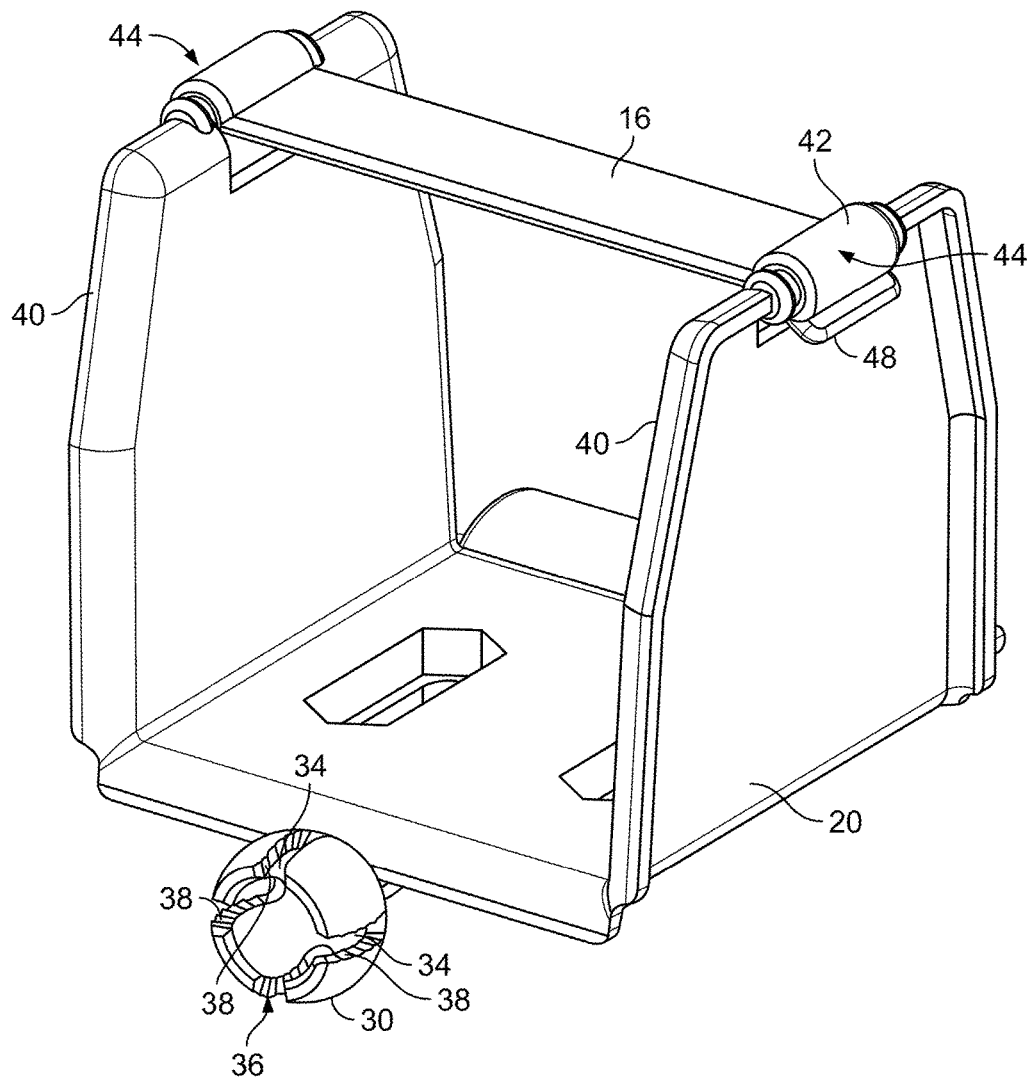
FIG. 3 illustrates the socket end of a fitting used to form the cable guide system of FIG. 1.

One of the fittings 12 usable within the system 10 is illustrated in FIGS. 2-3. The fitting 12a includes a base 14 and a cover/retainer 16 pivotally attached to the base 14. The base 14 defines a support surface 18 and a pair of opposing sidewalls 20 extending upwardly therefrom. Cooperatively, the support surface 18 and the sidewalls 20 define an open first end 22, an open second end 24, and an open top 26. The open top 26 is partially blocked by the cover 16 when the cover 16 is in the latched position, as will be described in further detail below.

Each fitting 12a is configured for attachment to a similar fitting 12a by a ball/socket type joint or mount. Each fitting 12a defines a ball mount 28 at the first end 22 and a socket mount 30 at the second end 24, wherein the ball mount 28 of a first fitting 12a can intermate with the socket mount 30 of an adjacent fitting 12a in forming the system 10. By providing each fitting 12a with both a ball mount 28 and a socket mount 30 for inter-attachment, manufacturing efficiencies may be achieved.

Still referring to FIGS. 2-3, each ball mount 28 defines a plurality of pins 32 provided on the surface of the ball mount 28. In the depicted embodiment, four pins 32 are provided, one on the top, one on the bottom, one on the left, and one on the right side of the ball mount 28, wherein all of the pins 32 are generally aligned along a plane generally parallel to the first open end 22 of the fitting 12a.

Each socket mount 30 defines a plurality of slots 34 extending in a direction from an end 36 of the socket mount 30 toward the base 14 of the fitting 12a. In the depicted embodiment, four slots 34 are provided that are configured to align with the pins 32 of the ball mount 28. One slot 34 extends along the top, one slot 34 extends along the bottom, one slot 34 extends along the left side, and one slot 34 extends along the right side of the socket mount 30.

The pins 32 and the slots 34 are configured to restrict the otherwise 360-degree rotational motion provided by the ball/socket joint. The top and bottom pins 32 can ride within the top and bottom slots 34, respectively, as two fittings 12a are pivotally articulated along a first plane P1. The right and left pins 32 can ride within the right and left slots 34, respectively, as two fittings 12a are pivotally articulated along a second plane P2 generally perpendicular to the first plane P1.

As shown, each of the slots 34 defines a series of detents 38 at various increments along the slots 34. The detents 38 are configured to interact with the pins 32 and provide various stop or fixed positions for the two fittings 12a as the fittings 12a are articulated to a desired orientation with respect to each other.

The detents 38 may be spaced to provide stop positions at preselected angle increments, such as every 15 degrees, for the articulating fittings 12a. The closed ends of the slots 34 provide the maximum deflection angle between the two articulating fittings 12a.

Each sidewall 20 of the base 14 also defines an angled portion 40 that act to provide positive stops when abutting a similar fitting 12a as the fittings 12a are pivotally articulated along the first plane P1.

The cover/retainer 16 is configured to at least partially block the open top 26 of the base 14 to retain the fibers/cables within the pathway created by the articulating guide system 10. In the depicted embodiment, the cover 16 defines a C-shaped latch/catch 42 at each end 44 that allows both snap-fit latching and pivotal motion with respect to hinge posts 46 defined at the top of the sidewalls 20.

As shown, the cover 16 (as well as the sidewalls 20) defines a similar configuration at each end 44 and can be unlatched and latched from either end 44. A tab 48 provided adjacent the C-shaped latch 42 facilitates opening and closing of the cover 16.

Figure 4:
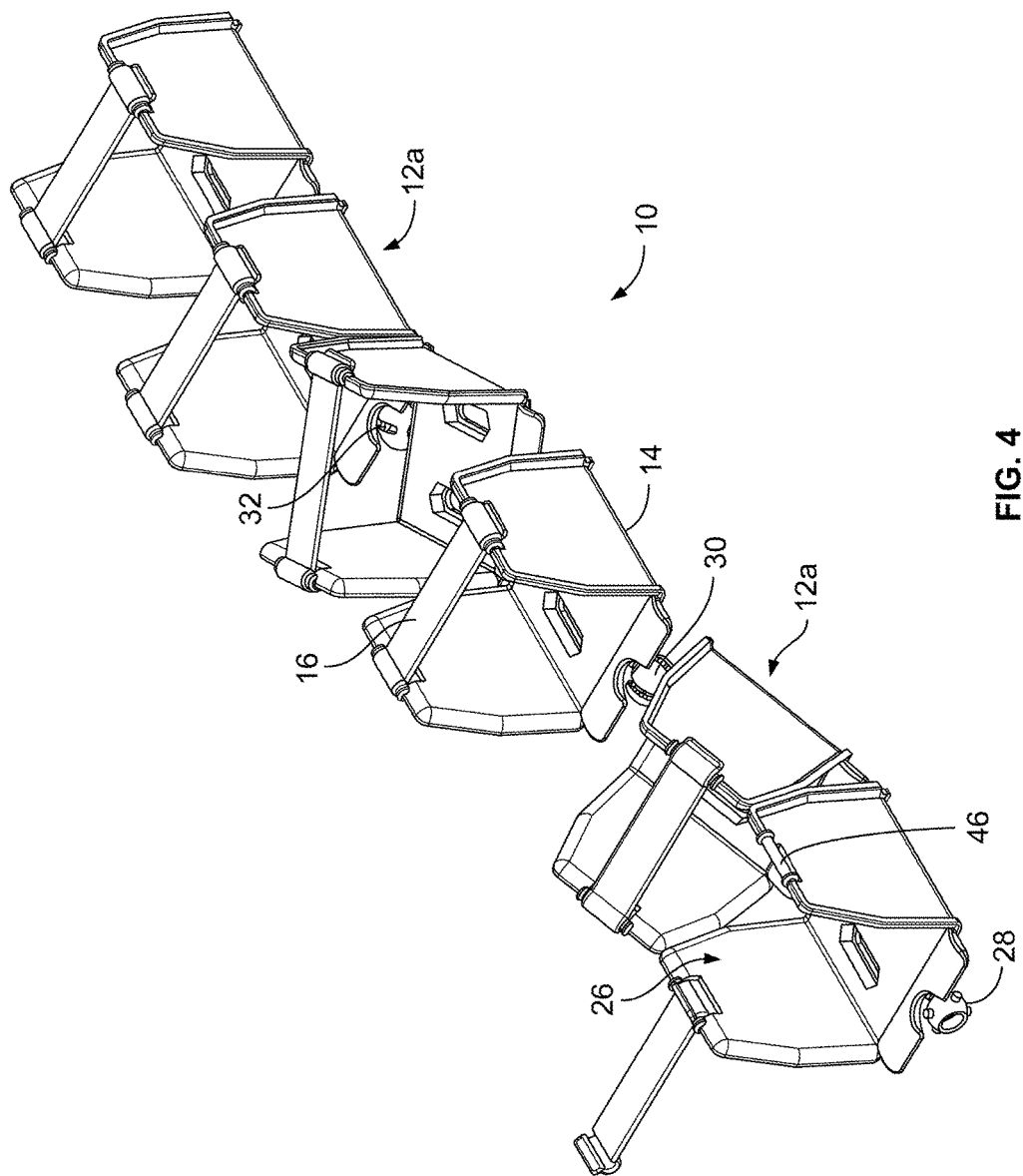
FIG. 4 illustrates a top perspective view of a system formed solely from the fittings shown in FIGS. 2-3.
Figure 5:
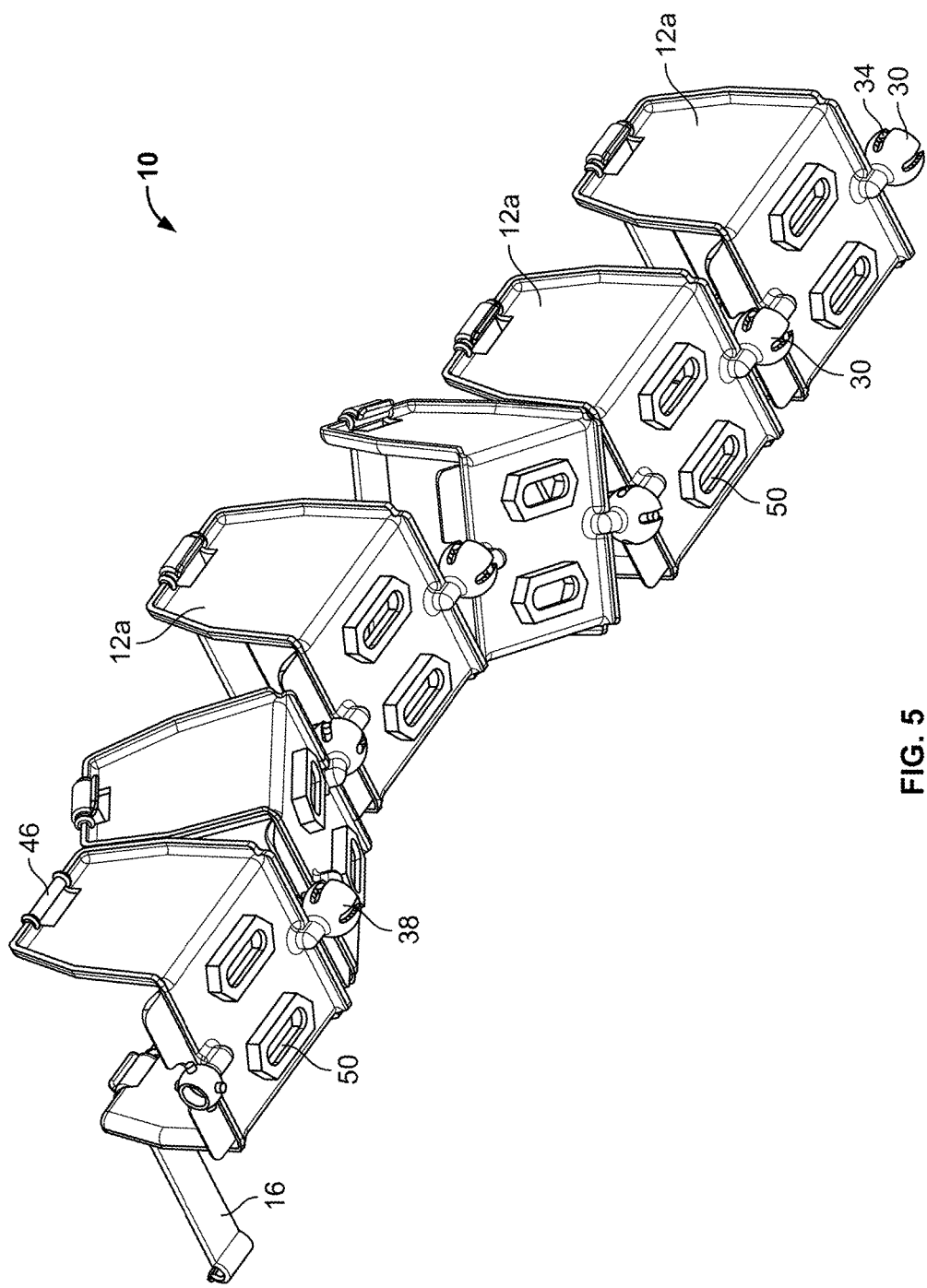
FIG. 5 illustrates a bottom perspective view of the system of FIG. 4.

FIGS. 4-5 illustrate a fiber guide system 10 formed solely of the fittings 12a of FIGS. 2-3, wherein the fittings 12a are shown in various articulated positions. As shown in FIG. 5, the base 14 of each fitting 12a defines fastener openings 50 through the support surface 18 thereof for mounting the guide system 10 to various fixtures such as support brackets, etc.

In FIGS. 4-5, the cover 16 of one of the fittings 12a is shown in an open position.

As noted above, the guide system 10 of the present application may utilize a number of different types of fittings 12, depending upon the use of the system 10.

FIGS. 6-10 illustrate a fitting 12b having a different configuration than the fitting 12a shown in detail in FIGS. 2-5. The fitting 12b shown in FIGS. 6-10 may be referred to as a universal fitting 12b since it not only allows mounting and articulation with respect to other similar fittings 12b to provide a cable pathway between the sidewalls 20' but also allows for a cable pathway through at least one of the sidewalls 20' in a perpendicular direction.

Figure 6:
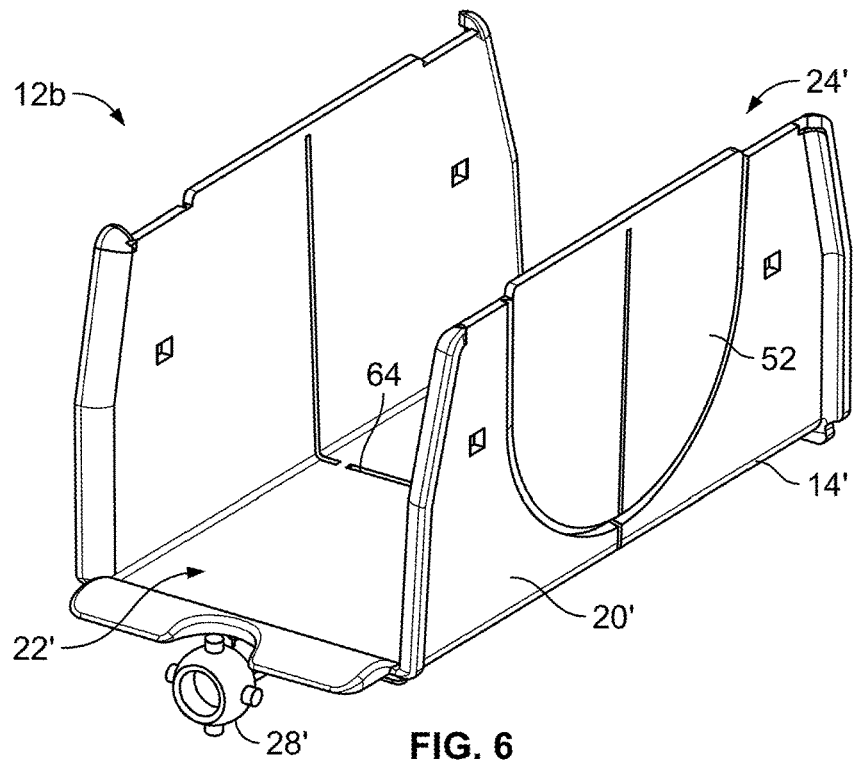
FIG. 6 illustrates one of the universal fittings that can be used to form the cable guide system of FIG. 1.

As shown in FIG. 6, the universal fitting 12b defines a first open end 22', a second open end 24', and ball and socket mounts 28', 30' at the first and second ends 22', 24' similar to the fitting 12a of FIGS. 2-5. However, the base 14' of the universal fitting 12b defines a generally longer dimension than that of the fitting 12a of FIGS. 2-5. Further, in the universal fitting 12b, at least one of the sidewalls 20' is formed as a break-out or a knock-out sidewall and includes break-out or knock-out portions 52 for forming a side opening/exit 54 that is generally perpendicular to the open first and second ends 22', 24'. The side exit 54 provides another option for routing fibers/cables using the system 10. It should be noted that both of the sidewalls 20' of the universal fitting 12b may be provided as break-out or knock-out sidewalls 20' to allow further routing flexibility to the system 10.

Figure 7:
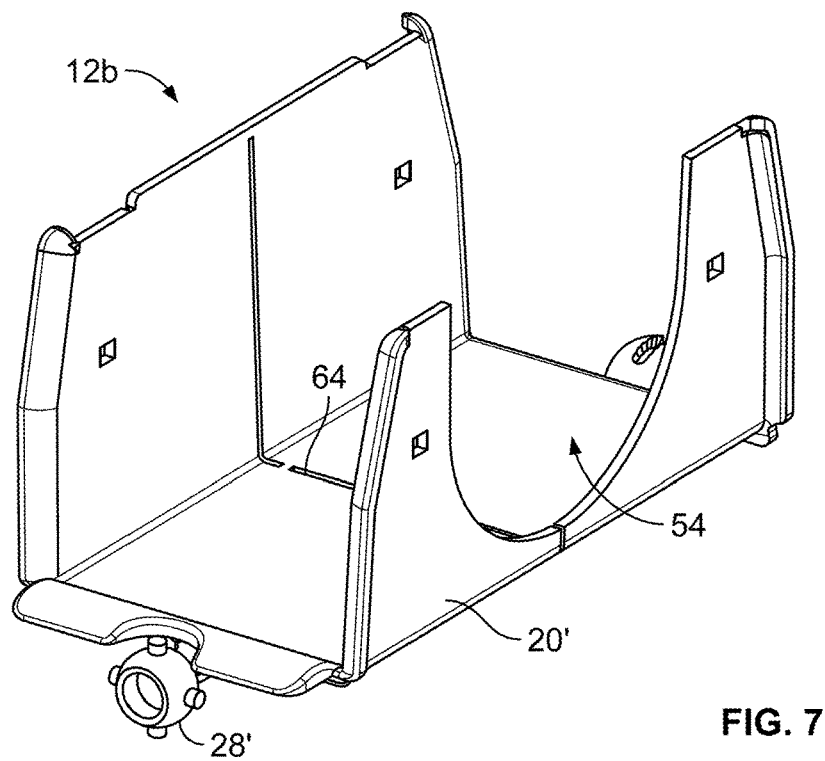
FIG. 7 illustrates the universal fitting of FIG. 6 with the break-out portions of the sidewalls removed.

One of the sidewalls 20' of the universal fitting 12b is shown in FIG. 7 without the break-out portions 52, with the side opening 54 formed.

Figure 8:
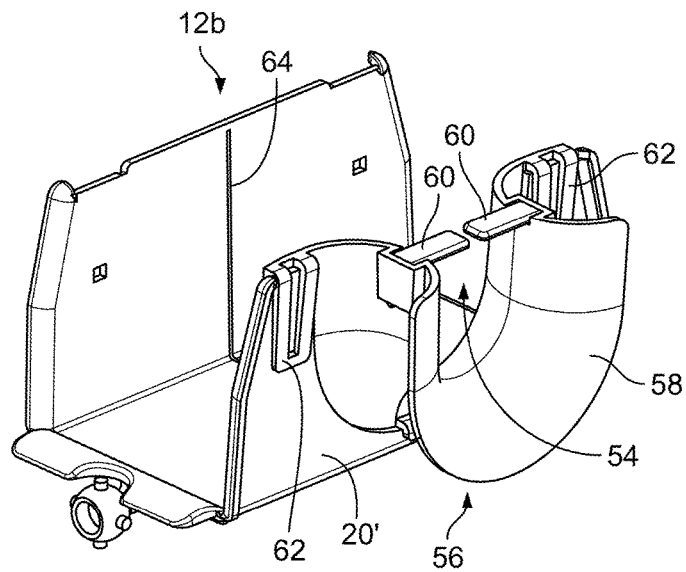
FIG. 8 illustrates the universal fitting of FIGS. 6-7 with a cable manager attached to a side exit formed on the fitting.
Figure 9:
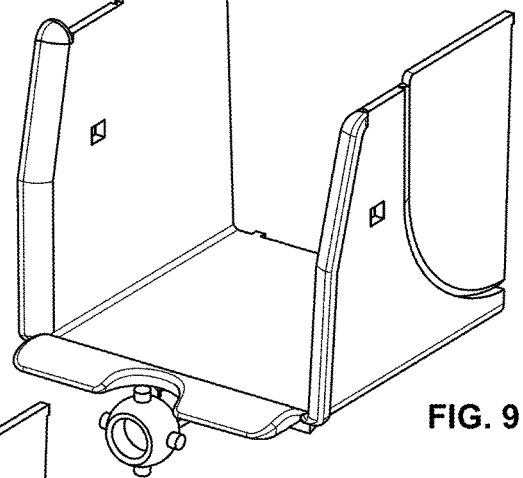
FIG. 9 illustrates a ball-only end fitting formed by splitting the universal fitting of FIG. 6 in half.

Now referring to FIG. 8, the universal fitting 12b is shown with a cable management structure 56 (e.g., defining a trumpet-like configuration) mounted to the sidewall 20' of the fitting 12b. The cable management structure 56 defines curved fiber guiding surfaces 58 that are configured to meet minimum bend radius requirements as the cable management structure 56 routes cables away from the fitting 12b.

The cable management structure 56 also includes cable management fingers 60 for retaining the fibers/cables within the side opening 54 that has been formed by removing the break-out portions 52.

As shown in FIG. 8, in the depicted embodiment, the cable management structure 56 includes attachment features 62 for slidable attachment to the sidewalls 20' of the universal fitting 12b.

Figure 10:
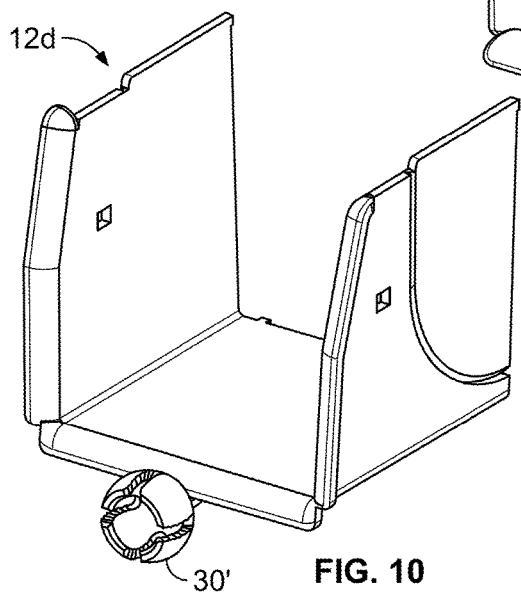
FIG. 10 illustrates a socket-only end fitting formed by splitting the universal fitting of FIG. 6 in half.

Still referring to FIGS. 6-8, the universal fitting 12b defines a split line or indent 64 for allowing the universal fitting 12b to be split or cut down the middle into a ball-only end fitting 12c (shown in FIG. 9) or a socket-only end fitting 12d (shown in FIG. 10).

Such end fittings 12c, 12d may be used at the ends of a guide system 10 that is made up of articulating elements if the ends of the guide system 10 are going to be attached to preexisting non-articulating guide systems or fixtures. In this manner, the universal fitting 12b provides the flexibility to use both a ball and a socket mount 28', 30' on the same fitting 12b or define a ball-only or a socket-only mount at one end and a straight edge at the opposite end for snapping to preexisting, non-articulating structures.

While the inventive systems 10 of the disclosure have been described with respect to cables having optical fibers as transmission media, according to further embodiments, cables having other types of transmission media (e.g., electrical conductors formed of copper or other metal) may be used with the inventive systems 10 provided in the present disclosure.

The individual fittings can be arranged in any orientation relative to the horizontal or the vertical directions, as desired. For example, the open top 26 can be oriented to form an open side horizontally or vertically, or other direction.

The above specification, examples and data provide a complete description of the manufacture and use of the composition of the disclosure. Since many embodiments of the disclosure can be made without departing from the spirit and scope of the disclosure, the inventive features reside in the claims hereinafter appended.

The invention claimed is:

1. An articulating cable guide system configured for routing cables, the guide system comprising:
   a plurality of fittings connected together via ball and socket coupling, wherein each fitting includes a base defining a cable support surface and a pair of opposing sidewalls extending therefrom, the support surface and the sidewalls cooperating to define an open first end, an open second end, and a top end that is configured to provide an access opening for placement of the cables into the base, wherein each fitting includes at least one of a ball mount and a socket mount that is configured to fit the ball mount, the ball mount including a plurality of pins aligned along a first plane and the socket mount defining a plurality of slots configured to receive the pins of the ball mount, wherein the pins and the slots are configured to restrict the movement of the ball and socket coupling to pivotal motion generally along two perpendicular planes, wherein each of the two perpendicular planes is different than the first plane, wherein each slot of the socket mount defines detents for interacting with one of the pins of the ball mount to provide discrete stop positions to the fittings along their pivotal movement.

2. The cable guide system of claim 1, wherein each of the two perpendicular planes is perpendicular to the first plane.

3. The cable guide system of claim 1, wherein at least one of the fittings of the plurality of fittings includes a pivotally closable cover to at least partially cover the access opening provided by the top of the base.

4. The cable guide system of claim 1, wherein at least one of the fittings of the plurality of fittings includes only a ball mount.

5. The cable guide system of claim 1, wherein at least one of the fittings of the plurality of fittings includes only a socket mount.

6. The cable guide system of claim 1, wherein at least one of the fittings of the plurality of fittings includes both a ball mount on one end and a socket mount on an opposite end.

7. The cable guide system of claim 6, wherein at least one of the fittings of the plurality of fittings includes a sidewall defining breakable portions.

8. The cable guide system of claim 6, wherein at least one of the fittings of the plurality of fittings is scored to define a breakline for forming the fitting into two different fittings, one defining a ball-only mount and the other defining a socket-only mount.

9. The cable guide system of claim 6, wherein at least one of the fittings of the plurality of fittings defines a side exit in addition to the open first and second ends.

10. The cable guide system of claim 9, further comprising a cable management structure mounted to the side exit of the fitting, the cable management structure defining minimum bend radius surfaces configured for fiber optic cables.

11. A fitting configured to create an articulating cable guide system for routing cables, the fitting comprising:
   a base defining a cable support surface and a pair of opposing sidewalls extending therefrom, the support surface and the sidewalls cooperating to define an open first end, an open second end, and a top end that is configured to provide an access opening for placement of the cables into the base, wherein the fitting includes at least one of a ball mount and a socket mount that is configured to fit the ball mount, the ball mount including a plurality of pins aligned along a first plane and the socket mount defining a plurality of slots configured to receive the pins of the ball mount, wherein the pins and the slots are configured to restrict the movement of the ball and socket coupling to pivotal motion generally along two perpendicular planes, wherein each of the two perpendicular planes is different than the first plane, wherein each slot of the socket mount defines detents for interacting with one of the pins of the ball mount to provide discrete stop positions to the fittings along their pivotal movement.

12. The fitting of claim 11, wherein each of the two perpendicular planes is perpendicular to the first plane.

13. The fitting of claim 11, further comprising a pivotally closable cover to at least partially cover the access opening provided by the top end of the base.

14. The fitting of claim 11, wherein the fitting includes only a ball mount.

15. The fitting of claim 11, wherein the fitting includes only a socket mount.

16. The fitting of claim 11, wherein the fitting includes both a ball mount on one end and a socket mount on an opposite end.

17. The fitting of claim 16, wherein the fitting includes a sidewall defining breakable portions.

18. The fitting of claim 16, wherein the fitting is scored to define a breakline for forming the fitting into two different fittings, one defining a ball-only mount and the other defining a socket-only mount.

19. The fitting of claim 16, wherein the fitting defines a side exit in addition to the open first and second ends.

20. The fitting of claim 19, further comprising a cable management structure mounted to the side exit of the fitting, the cable management structure defining minimum bend radius surfaces configured for fiber optic cables.

21. A fitting configured to create an articulating cable guide system for routing cables, the fitting comprising:

a base defining a cable support surface and a pair of opposing sidewalls extending therefrom, the support surface and the sidewalls cooperating to define an open first end, an open second end, and a top end that is configured to provide an access opening for placement of the cables into the base, wherein the fitting includes a ball mount at the first end and a socket mount that is configured to fit the ball mount at the second end, the ball mount including a plurality of pins aligned along a first plane and the socket mount defining a plurality of slots configured to receive the pins of the ball mount, wherein the pins and the slots are configured to restrict the movement of the ball and socket coupling to pivotal motion generally along two perpendicular planes, wherein each of the two perpendicular planes is different than the first plane, wherein each slot of the socket mount defines detents for interacting with one of the pins of the ball mount to provide discrete stop positions to the fittings along their pivotal movement, wherein at least one of the sidewalls of the base defines breakable portions for forming a side exit in addition to the open first and second ends, and wherein the fitting defines a breakline for forming the fitting into two different fittings, one defining a ball-only mount and the other defining a socket-only mount.

\* \* \* \* \*

UNITED STATES PATENT AND TRADEMARK OFFICE
CERTIFICATE OF CORRECTION

PATENT NO. : 10,444,459 B2
APPLICATION NO. : 15/769703
DATED : October 15, 2019
INVENTOR(S) : Timothy Jon Haataja Page 1 of 1

It is certified that error appears in the above-identified patent and that said Letters Patent is hereby corrected as shown below:

In the Claims

Column 6, Line 19, Claim 3: "the top of the base." should read --the top end of the base.--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*